United States Patent [19]
Copp, Jr.

[11] 3,915,581
[45] Oct. 28, 1975

[54] RUBBER PAVING
[76] Inventor: Martin Phillip Copp, Jr., 730 Edgemere Lane, Sarasota, Fla. 33581
[22] Filed: Feb. 1, 1974
[21] Appl. No.: 438,544

[52] U.S. Cl. .................................. 404/32; 404/72
[51] Int. Cl.² .................................. E01C 5/18
[58] Field of Search .................. 404/32, 33, 72, 82

[56] References Cited
UNITED STATES PATENTS

| | | | |
|---|---|---|---|
| 1,434,908 | 11/1922 | Morton et al. | 404/32 X |
| 1,482,952 | 2/1924 | Stedman | 404/32 X |
| 1,661,828 | 3/1928 | Hopkinson | 404/32 X |
| 1,758,914 | 5/1930 | Sadtler | 404/32 X |
| 1,898,425 | 2/1933 | Cowen et al. | 404/32 X |
| 1,967,904 | 7/1934 | Roberts | 404/32 X |
| 2,413,901 | 1/1947 | Abernathy | 404/32 X |
| 2,977,864 | 4/1961 | Pullar | 404/32 X |
| 3,253,521 | 5/1966 | Endres | 404/32 X |

Primary Examiner—Nile C. Byers, Jr.
Attorney, Agent, or Firm—Mattern, Ware & Davis

[57] ABSTRACT

A rubber paving installation and method utilizes reprocessed rubber from automobile tires, or the like, or any other suitable natural or synthetic rubber which is processed into a condition to be vulcanized, applied to a surface to be paved, and vulcanized in place. The outer surface of the paving may be vulcanized to a higher degree than the remainder of the paving layer. The paving is particularly suitable for roadways and may be applied to any suitable roadbed such as a gravel and tar bed, or a concrete or black top bed, to provide a vulcanized rubber road.

10 Claims, 1 Drawing Figure

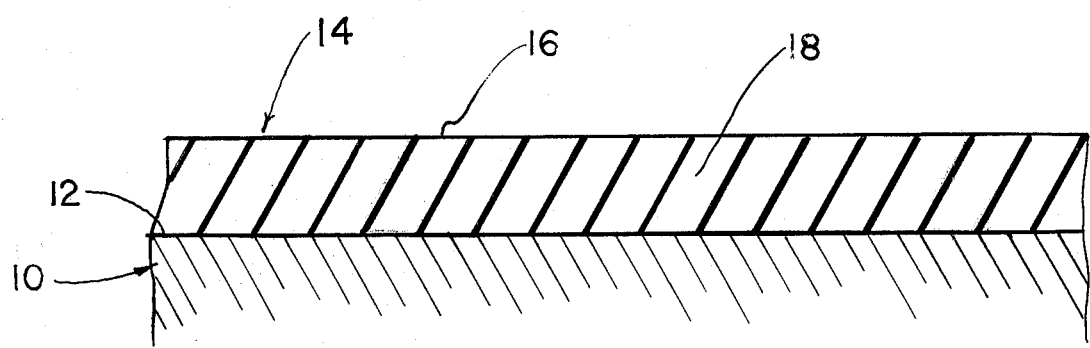

RUBBER PAVING

This invention relates to paving and, more particularly, to a vulcanized rubber paving installation and method.

BACKGROUND OF THE INVENTION

Various types of rubber paving are black in the art and generally include a binder of black top, asphalt, or the like, and rubber, to which various fillers may be added. These fillers are often in the form of shredded or ground reclaimed rubber and sometimes other aggregates such as gravel may be added. Mixing of such paving compositions is often complicated and may require expensive additional components such as epoxy resin to form a bond between the aggregate and the rubberized binder. Another difficulty often encountered with rubber paving having aggregate additives is that after a period of time the aggregate at the surface separates from the binder thus leaving a small pot hole in the surface of the rubber paving.

Numerous United States patents relate to rubber paving, its processing and application, and these patents include:

| | | |
|---|---|---|
| 1,940,528 | 2,811,906 | 3,245,329 |
| 2,378,717 | 2,853,742 | 3,297,625 |
| 2,612,479 | 2,952,650 | 3,461,844 |
| 2,653,916 | 2,977,864 | 3,700,615 |
| 2,809,944 | 3,042,633 | |

A suitable process for processing the rubber is shown in U.S. Pat. No. 3,700,615 and other processes are shown in U.S. Pat. Nos. 2,612,479, and 2,809,944. 2,653,916 shows equipment for reclaiming rubber, and 3,245,329 shows equipment suitable for applying the rubber paving.

In view of the used tire situation, now completly out of hand throughout the country, used tires are a main source of rubber for the paving. Rather than adding shredded or ground rubber to a binder, all of the rubber may be reprocessed into a vulcanizing state and applied as a substantially solid homogeneous mass to the surface to be paved. Rubber processing equipment can be used to heat the rubber, and used lubricating oil and the like, may be utilized in such equipment as fuel for providing the required heat. Therefore, economically speaking, rubber road plants will have minimal running costs while supplying a vast number of advantages considering the need for recycling in keeping with the ecological effort.

The paving installation and method involves applying rubber, ready to be vulcanized, to a supporting surface to be paved, such as a roadbed, for example. It has been found through experimentation that a low vulcanized rubber will better adhere to and seal a road surface than will rubber in a high state of vulcanization. However, further activation of vulcanization is provided for the outer layer of the paving to provide durability while retaining resiliency of the paving. The rubber paving of this invention adheres to the surface to be paved and thus holding it together, and also seals the surface. The flexible quality of vulcanized rubber enables all surfaces to expand and contract during frost heaves and intense heat, without cracking or bulging, and thus road repair is minimized.

When applied as paving for a roadway, automobiles riding over the road are cushioned by the resilient rubber paving, thus reducing shock and vibration so apparent when driving on surfaces of concrete, asphalt, or the like. Rubber paving also provides traction superiority over general types of paving.

As used here in the term "rubber" is used to include natural rubber as well as synthetic rubber, and mixtures thereof.

It is a primary object of this invention to provide a new and useful paving installation and method.

Another object is provision of a new and useful paving installation which is both economical and durable.

A further object is provision of a new and useful vulcanized rubber paving installation and method.

The invention, in brief, is directed to a vulcanized rubber paving installation and method in which the paving firmly adheres to and seals the supporting surface, such as a roadbed, while providing a resilient surface with a tough durable outer surface. A rubber to be vulcanized is applied to the surface to be paved, and the outer surface of the paving is vulcanized to a higher degree through oxidation or by the addition thereto of various vulcanizing agents.

Additional objects and advantages of the invention will be apparent from the following description and the accompanying drawing which is a fragmentary, schematic elevational sectional view of the paving installation.

DESCRIPTION OF THE PREFERRED EMBODIMENT

Referring to the drawing, a suitable supporting base 10 such as a typical roadbed has an upper surface 12 to which a vulcanized rubber paving layer 14 is applied. Supporting base 10 may be of any type suitable to the environment and in a roadway is usually either a concrete, asphalt or similar roadbed, having a substantially solid upper surface 12 or, alternatively, a gravel and tar roadbed. When applying the paving layer 14, the surface 12 should be dry and free of foreign matter so that the paving may adhere tightly to the surface.

The rubber may be processed in any suitable manner as by the cold vulcanization process (using a volatile solvent and vulcanizing agent); by the hot mold process and using rubber particles in a foam carrier, hot liquid rubber, or any rubber in a plasticized state; or by the process described hereinafter.

In view of the excess of used automotive tires, rubber from the tires is preferable shredded or powdered and processed to suitable vulcanizing condition and applied to the surface 12. Upon applying the rubber to the surface 12, an outer surface portion 16 normally vulcanizes to a higher degree than the body 18 of the layer 14. Such differential vulcanization occurs in the following process, primarily because the surface portion 16 is exposed to ambient air in which oxygen serves as a vulcanizing agent, whereas the body 18 is not exposed to additional vulcanizing agents. If desired, particularly in certain other previously mentioned processes, other vulcanizing agents may be applied to the paving surface 16.

In preparing a suitable paving composition, polmerized rubber, such as No. 25VLY, manufactured by American Synthetic Rubber Corporation, Louisville, Kentucky was combined with the following ingredients, in the following percentages, by volume:

| | |
|---|---|
| Sulfur | 3–4% |
| Methyl Tuades | 1.5% |
| Zinc Oxide | 3% |
| Triethanolamine | 2% |
| Carbon Black | 46% | and the remainder rubber. The ingredients are heated to 300°F and held at this temperature for approximately one to one and a quarter hours while being mixed by stirring as with a glass rod until the composition just starts to vulcanize.

When the mixture is still at approximately 300°F it is applied by pouring onto the surface 12, for example a tar and gravel surface which is dry and substantially clean of foreign matter. The rubber paving may be spread and smoothed in any suitable manner and vulcanizes without the addition of heat, to provide a solid, substantially homogeneous body. As previously mentioned, the outer surface portion 16 of the layer 14 vulcanizes to a higher degree than the remainder of the body 18 because of the oxidizing effect of oxygen in the air. However, any suitable vulcanizing agent may be spread on the surface 16 to further increase its degree of vulcanization.

The lower degree of vulcanization of the body of the layer, particularly the lower face of the body, provides greater adherence of the rubber paving to the surface 12 and more effectively seals any voids in the surface 12. Any suitable type of filler may be added to the rubber composition, such as gravel, shredded rubber, or the like, but are not considered advisable under the present circumstances.

While this invention has been described and illustrated with reference to particular embodiments in particular environments, various changes may be apparent to one skilled in the art and the invention is therefore not to be limited to such embodiments or environments except as set forth in the appended claims.

What is claimed is:

1. A method for solidifying a carbon black reinforced polymer on a surface to which said polymer is self-adhering comprising the steps of:
   A. forming a carbon black reinforced polymer comprising a synthetic polymer and carbon black;
   B. preparing a solidification composition consisting essentially of said carbon black reinforced polymer and a solidification agent; and
   C. applying said solidification composition to the desired surface; and
   D. allowing said composition to solidify on said surface, self-adhering thereto.

2. The method defining claim 1, wherein said solidification process is carried out at ambient conditions.

3. The method defining claim 1, wherein said solidification process is carried out at elevated temperatures.

4. The method defined in claim 1, wherein said carbon black reinforced polymer is produced by plasticizing scrap material selected from the group consisting of rubber and synthetic plastics.

5. The method defined in claim 1, wherein said solidification agent is one selected from the group consisting of vulcanizing agents and gelling agents.

6. The method defined in claim 1, wherein said synthetic polymer is at least one selected from the group consisting of synthetic plastic and synthetic rubber.

7. The method defined in claim 1, wherein said surface is an asphalt road and said composition chemically bonds to the asphalt road.

8. The method for solidifying a carbon black reinforced polymer on a surface so that said polymer self-adheres thereto comprising the steps of:
   A. forming a carbon black reinforced polymer comprising a synthetic polymer and carbon black by plasticizing scrap material selected from the group consisting of used rubber tires and commercial plastics;
   B. preparing a rubber paving composition consisting essentially of between about 89% and 91% by volume of said carbon black reinforced polymer, about 5% by volume of at least one accelerator, between about 3% and 4% by volume of a vulcanizing agent, and between about 1% and 2% by volume of an activator;
   C. heating said rubber paving composition to about 300°F.;
   D. stirring said rubber paving composition at said elevated temperature until said composition starts to vulcanize;
   E. pouring and spreading said rubber paving composition over the desired surface;
   F. allowing said composition to vulcanize directly to said surface, self-adhering thereto.

9. The method of paving a surface with rubber defined in claim 8, wherein said carbon black reinforced polymer is further defined as comprising approximately 45% by volume of carbon black and further comprising the additional step of:
   G. adding synthetic polymer or carbon black to bring the quantity of carbon black to approximately 45%.

10. A method of paving a surface with rubber comprising the steps of:
    A. forming a carbon black reinforced polymer comprising a synthetic polymer and carbon black by plasticizing scrap materials selected from the group consisting of used rubber tires and commercial plastics;
    B. preparing a rubber paving composition consisting essentially of carbon black reinforced polymer and solidifying agents;
    C. applying said rubber paving composition over the desired surface; and
    D. allowing said rubber paving composition to solidify directly to said surface, self-adhering thereto.

* * * * *